United States Patent
Ohgi

(10) Patent No.: US 7,533,397 B2
(45) Date of Patent: *May 12, 2009

(54) DISC CARTRIDGE

(75) Inventor: Takashi Ohgi, Miyagi (JP)

(73) Assignee: Sony Corporation, Tokyo (JP)

( * ) Notice: Subject to any disclaimer, the term of this patent is extended or adjusted under 35 U.S.C. 154(b) by 336 days.

This patent is subject to a terminal disclaimer.

(21) Appl. No.: 11/301,164

(22) Filed: Dec. 12, 2005

(65) Prior Publication Data

US 2006/0130091 A1 Jun. 15, 2006

(30) Foreign Application Priority Data

Dec. 10, 2004 (JP) ............................. 2004-359015

(51) Int. Cl.
G11B 23/03 (2006.01)
(52) U.S. Cl. ....................................... 720/740; 720/738
(58) Field of Classification Search ......... 720/738–744; 360/133

See application file for complete search history.

(56) References Cited

U.S. PATENT DOCUMENTS 5,014,151 A 5/1991 Uehara et al.
2002/0126614 A1 9/2002 Bagnell et al.
2005/0160445 A1* 7/2005 Ohgi ........................... 720/738
2005/0183108 A1* 8/2005 Okazawa et al. ............ 720/725
2005/0210491 A1* 9/2005 Ohgi ........................... 720/725
2006/0174258 A1* 8/2006 Kurita et al. ................ 720/740

FOREIGN PATENT DOCUMENTS

EP 1594135 A1 9/2005
JP 63072777 U * 5/1988
JP 08315537 A * 11/1996

* cited by examiner

Primary Examiner—William J Klimowicz
(74) Attorney, Agent, or Firm—Wolf, Greenfield & Sacks, P.C.

(57) ABSTRACT

A disc cartridge including a cartridge body and a disc housed therein. The cartridge body has an aperture exposing part of the disc and a shutter to open and close the aperture. The shutter has a connecting arm extending from one side. An elastic moving piece extends along the connecting arm with the base end fixed to the free end of the connecting arm. The base end of the shutter has a movement guide piece with a window through which a pressing piece projects. A shutter movement limiting member pivots on the shutter to limit the shutter from opening when the aperture is closed by engaging an engagement portion on a movement limiter provided on the cartridge body. The shutter movement limiting member further pivots with the elastic moving piece to disengage the engagement portion from the movement limiter when a force is applied to the pressing piece.

6 Claims, 10 Drawing Sheets

DISC CARTRIDGE

CROSS REFERENCES TO RELATED APPLICATIONS

The present invention contains subject matter related to Japanese Patent Application JP 2004-359015 filed in the Japanese Patent Office on Dec. 10, 2004, the entire content of which is incorporated herein by reference.

BACKGROUND OF THE INVENTION

1. Field of the Invention

The present invention relates to a disc cartridge housing a disc such as optical disc.

2. Description of the Related Art

In the past, there are widely used disc cartridges each of which has a disc-shaped recording medium such as optical disc housed rotatably in a body thereof and is to be loaded in a disc recording and/or playback apparatus with the disc-shaped recording medium being kept housed in the cartridge body. The disc cartridge of this type can protect the disc-shaped recording medium housed therein and facilitate loading and unloading of the disc-shaped recording medium into and from the disc recording and/or playback apparatus.

To enable write and/or read of information signals to and/or from the above disc cartridge loaded in a disc recording and/or playback apparatus with the disc-shaped recording medium being kept housed in the body of the disc cartridge, the disc cartridge has formed in the body thereof a driving aperture through which the disc-shaped recording medium is to face a turn-table included in a disc rotation driving mechanism that rotates the disc-shaped recording medium, and a write and/or read aperture through which the signal recording area of the disc-shaped recording medium is partially exposed to outside in a range between inner and outer radii thereof.

The disc cartridge housing the disc-shaped recording medium has provided thereon a shutter member that opens and closes at least the write and/or read aperture to prevent dust or the like from entering the cartridge body and contaminating the disc-shaped recording medium.

There is also available a disc cartridge in which the shutter member is always forced by a forcing member such as a spring or the like in a direction to close the write and/or read aperture in order to prevent the write and/or read aperture from inadvertently being opened and a foreign matter such as the user's finger or the like from entering through the aperture to scratch the disc-shaped recording medium in the disc cartridge not loaded in any disc recording and/or playback apparatus, for example, during storage.

Also, there have been proposed in the Japanese Patent Application Laid Open No. 212872 of 1991 and Japanese Utility Model Application Laid Open No. 83274 of 1987 disc cartridges in which for easier fixation of a spring member that forces the shutter member, the spring member is provided integrally with the shutter member so that it can be fixed to the cartridge body simultaneously with installation of the shutter member to the cartridge body.

In the disc cartridge disclosed in the above Japanese Patent Application Laid Open No. 212872 of 1991, since the shutter member is only forced by the spring member in a direction to close the write and/or read aperture, if the user tries to move the shutter member by holding with the finger or the like against the force of the spring member, the shutter member will easily be moved in a direction to open the write and/or read aperture.

The disc cartridge disclosed in the Japanese Utility Model Application Laid Open No. 83274 of 1987 further includes a shutter movement limiting member to lock the shutter member having been moved to a position to close the write and/or read aperture. In this disc cartridge, the shutter member is thus locked by the shutter movement limiting member and can positively close the write and/or read aperture. However, since the shutter movement limiting member is installed to the cartridge body independently of the shutter member, it will add the number of parts of the disc cartridge and make the assembling work more complicated. Also, the cartridge body should have an inner space for installation of the shutter movement limiting member, which will make it difficult to design the disc cartridge itself smaller.

SUMMARY OF THE INVENTION

It is therefore desirable to overcome the above-mentioned drawbacks of the related art by providing an improved and novel disc cartridge.

It is also desirable to provide a disc cartridge capable of positively closing a write and/or read aperture formed therein to surely protect a disc housed in the body thereof.

It is also desirable to provide a disc cartridge capable of positively unlock a shutter member provided thereon.

According to the present invention, there is provided a disc cartridge including, according to the present invention, a disc; a cartridge body having the disc rotatably housed therein and having formed therein a write and/or read aperture through which part of the disc is exposed to outside in a range between inner and outer radii thereof a shutter member including a shutter portion to open and close the write and/or read aperture and installed to the cartridge body to be movable between a position to close the write and/or read aperture and a position to open the write and/or read aperture; a connecting arm extending from one lateral side of the shutter member; an elastic moving piece installed to extend along the connecting arm with the base end thereof being fixed to the free end of the connecting arm, having a pressing piece provided at the base end of the shutter member to face a window formed in a movement guide piece opposite to the one lateral side of the cartridge body and forced for the pressing piece to project to outside the cartridge body through the window; and a shutter movement limiting member provided pivotably on the shutter member to limit, when the shutter member is in the position to close the write and/or read aperture, the shutter member from moving in a direction to open the write and/or read aperture by engaging an engagement portion on a movement limiter provided on the cartridge body, and to pivot along with the elastic moving piece in a direction disengaging the engagement portion from the movement limiter when the elastic moving piece is pressed by means of the pressing piece against the force applied to the latter, the engagement portion being formed circular at the side of the movement limiter.

In the disc cartridge according to the present invention, since there are provided on the shutter member the shutter movement limiting member to limit the shutter member from moving in the direction to open the write and/or read aperture when the shutter member provided on the cartridge body to open and close the write and/or read aperture is in the position to close the write and/or read aperture, and the elastic moving piece to force the shutter movement limiting member in a direction to be engaged on the movement limiter provided on the cartridge body, so it is possible to limit the shutter member in the position to close the write and/or lead aperture in the direction to open the write and/or read aperture and positively close the write and/or read aperture, to thereby surely protect the disc housed in the cartridge body.

Also, since the engagement portion of the shutter movement limiting member is formed circular, it smoothly engages on and disengages from the movement limiter provided at the cartridge body. So, when the disc cartridge is loaded into a disc recording and/or playback apparatus, the shutter member can positively be unlocked.

DETAILED DESCRIPTION OF THE PREFERRED EMBODIMENTS

The disc cartridge according to the present invention will be described in detail below with reference to the accompanying drawings.

Figure 1:
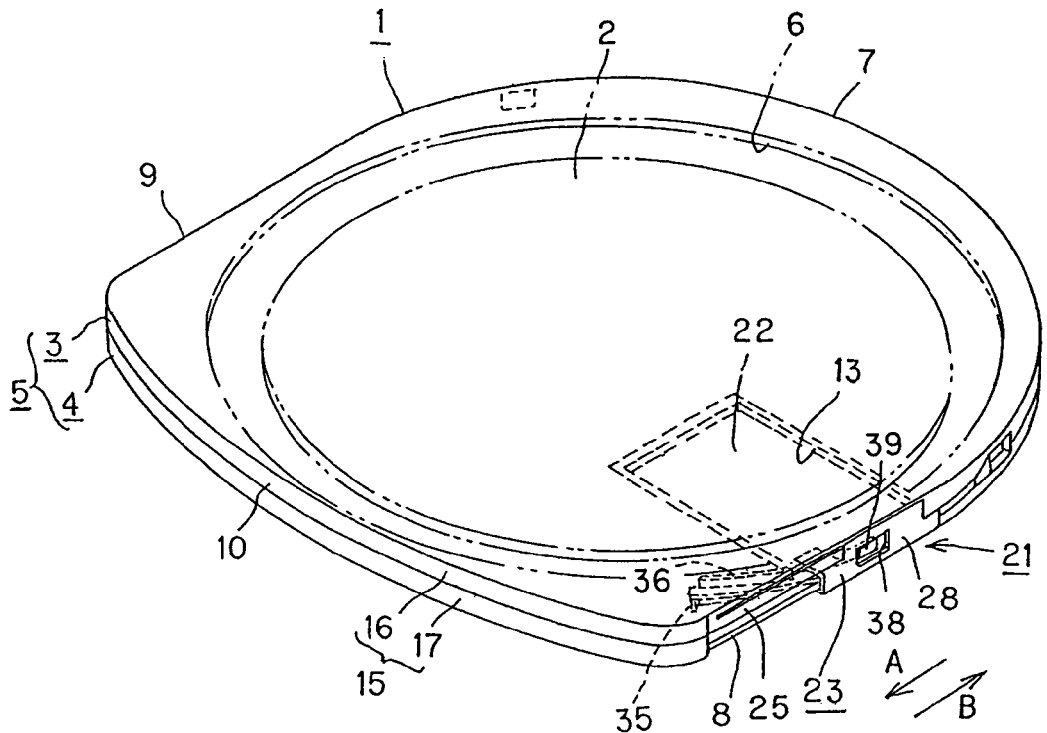
FIG. 1 is a perspective view, from the upper half, of the disc cartridge according to the present invention.
Figure 2:
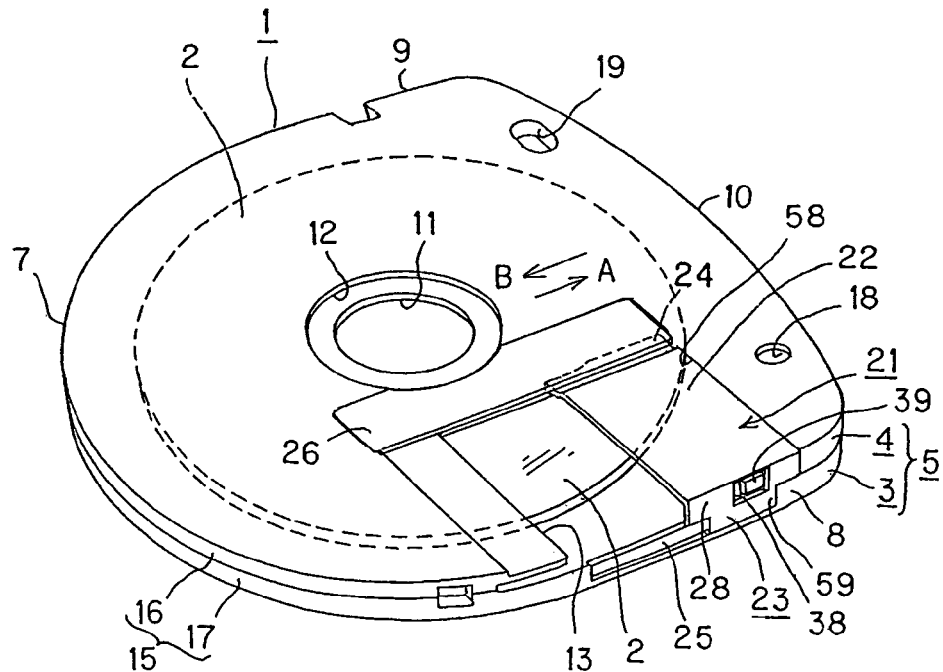
FIG. 2 is a perspective view, from the lower half, of the first disc cartridge in FIG. 1.

Referring now to FIGS. 1 and 2, there is schematically illustrated a disc cartridge of according to the present invention. The disc cartridge, generally indicated with a reference numeral 1, has housed therein, for example, an optical disc 2 as the disc-shaped recording medium. As shown, the disc cartridge 1 includes a body 5 formed by butt-joining a pair of body halves 3 and 4, upper and lower, to each other. This cartridge body 5 has the optical disc 2 as a disc-shaped recording medium housed rotatably therein. The upper and lower halves 3 and 4 of the cartridge body 5 are formed, by molding, from a synthetic resin such as polycarbonate.

The disc cartridge 1 houses an optical disc 2 having recorded therein program data and video data for performing a video game, for example, and it is designed extremely small. The disc cartridge 1 has housed therein an optical disc 2 of about 60 mm in diameter, which is so small a size that it can be held as a whole in the palm of one hand.

Figure 3:
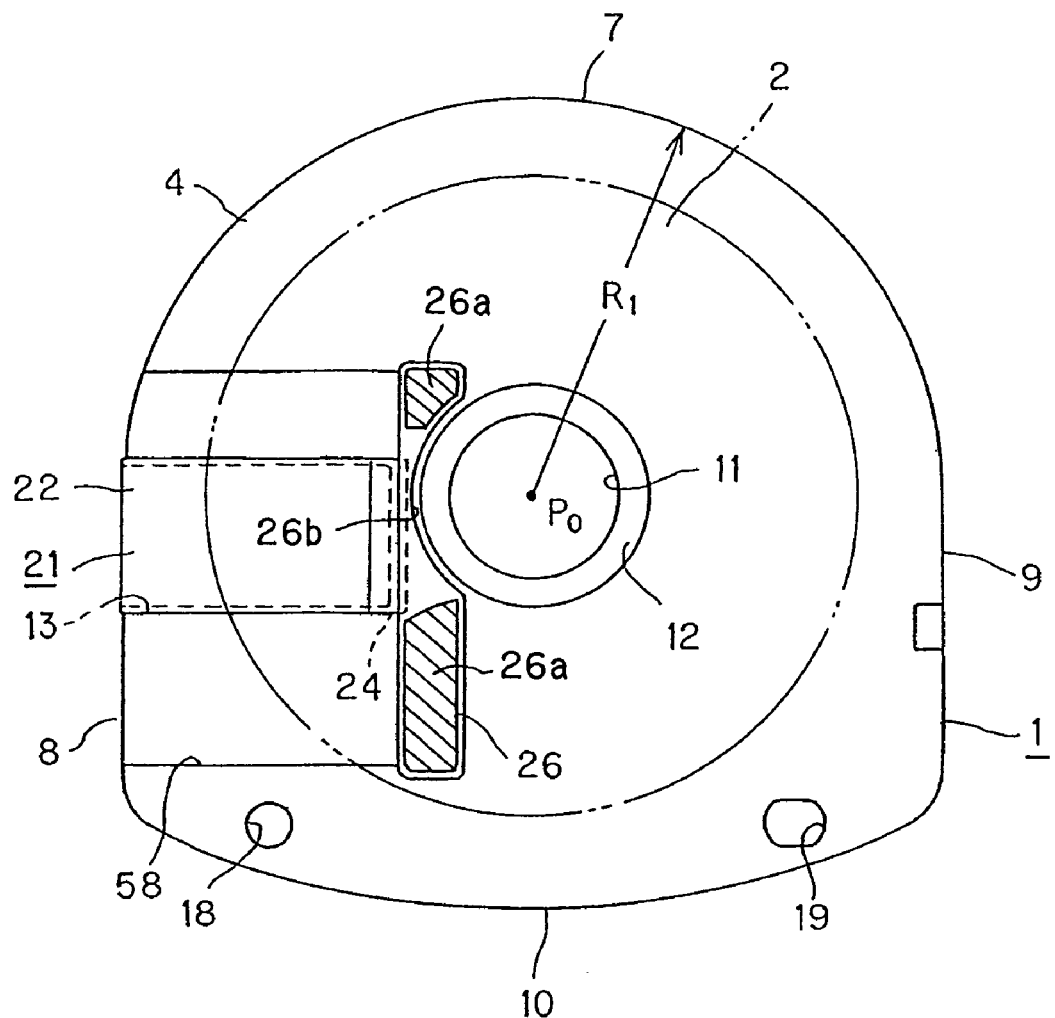
FIG. 3 is a plan view, from the lower half, of the disc cartridge in FIG. 1.

As shown in FIGS. 1 to 3, the cartridge body 5 of the disc cartridge 1 has a circular-formed front side 7 at which the disc cartridge 1 is first inserted into the disc recording and/or playback apparatus (will be referred to as "disc recorder/player" hereunder). As shown in FIG. 3, the circular front side 7 is generally a half of a circle taking, as its center, the center P0 of the optical disc 2 received in a disc receptacle 6 formed in the cartridge body 5 and which has a radius R1. That is, the circular front side 7 corresponds in shape to a half of the optical disc 2 received in the cartridge body 5.

In the cartridge body 5, the circular front side 7 is contiguous at opposite ends thereof to lateral sides 8 and 9, respectively, opposite and parallel to each other, and these lateral sides 8 and 9 are contiguous to a rear side 10 opposite to the circular front side 7 and which is gently curved. That is, the rear side 10 of the cartridge body 5 is smaller in curvature and larger in radius than the semicircular front side 7.

In the disc cartridge 1, the nearly semicircular front side 7 as one lateral side at which the disc cartridge 1 is to be first inserted into the disc recorder/player is formed largely curved as compared with the other sides. So, the largely curved front side 7 is a guide to inserting, by slot-in, the disc cartridge 1 correctly into the disc recorder/player through a cartridge slot. Especially, in case of a disc cartridge 1 designed to have so small a size that the user can hold it as a whole in the palm of one hand, the user can easily know, by holding it in hand, at which side of the disc cartridge 1 is to be first inserted into the disc recorder/player. Namely, the semicircular front side of the disc cartridge 1 will lead the user to load the disc cartridge 1 correctly into the disc recorder/player. As will further be described later, the disc cartridge 1 can be inserted easily and correctly into a slot-in type disc recorder/player. Further, since the disc cartridge 1 has the almost semicircular front side 7 at which it is to be first inserted into the disc recorder/player and the curved rear side 10 opposite to the circular front side 7, so it can be designed more approximate in shape and size to the optical disc 2 that is to be housed therein.

The lower half 4 as the bottom of the cartridge body 5 has formed at the center thereof a circular driving aperture 12 through which a central hole 11 formed at the center of the optical disc 2 housed in the cartridge body 5 and its rim are exposed to outside as shown in FIGS. 2 and 3. Part of a disc rotation driving mechanism provided at the disc recorder/player in which the disc cartridge 1 is to be loaded, for example, a turn-table, is to enter the driving aperture 12. Namely, the driving aperture 12 is used as an opening part of a mechanism to rotate the optical disc 2 is to enter.

As shown in FIGS. 2 and 3, the lower half 4 as the bottom of the cartridge body 5 has also formed therein a write and/or read aperture 13 (will also be referred to as "disc-access aperture" hereunder). The disc-access aperture 13 is located at one (8) of the lateral sides (8 and 9) of the cartridge body 5, and formed rectangular to extend from near the driving aperture 12 to the lateral side 8. That is, the disc-access aperture 13 is formed rectangular to have a sufficient size to expose part of the signal recording area of the optical disc 2 housed in the cartridge body 5 to outside in a range between inner and outer radii of the optical disc 2. It should be noted that the disc-access aperture 13 is opened at the lateral side 8 as shown in FIG. 2. Since the disc-access aperture 13 is open at the lateral side 8 as above, the optical head can scan up to the outermost radius of the optical disc 2. Thus, the optical disc 2 can be designed to have an increased signal recording area, which leads to an increased recording capacity of the optical disc 2.

Also, since the disc-access aperture 13 is formed not directly contiguous to the driving aperture 12 but with a connecting portion left between the apertures 12 and 13, which assures a mechanical strength of the lower half 4.

The surface of the upper half 3 butt-joined to the lower half 4 to form the top of the cartridge body 5, opposite to the optical disc 2, is flat having no opening or the like formed therein as shown in FIG. 1. The upper half 3 is, for example, light-transparent, and so the optical disc housed in the disc cartridge 1 is viewable from outside. For example, the user can see the content of printing on the surface of the optical disc 2 through the upper half 3.

The cartridge body 5 has an outer peripheral wall 15 formed by butt-joining of rising peripheral walls 16 and 17 formed along the abutting surfaces, respectively, of the upper and lower halves 3 and 4. The upper and lower halves 3 and 4 are joined integrally to each other by joining the free end faces of the rising peripheral walls 16 and 17 to each other by thermal or ultrasonic welding.

Also, the lower half 4 serves as a reference surface for loading the disc cartridge 1 into the disc recorder/player and has formed therein first and second positioning holes 18 and 19 in which a positioning pin provided at the disc recorder/player is to selectively be engaged, as shown in FIGS. 2 and 3. It should be noted that the first and second positioning holes 18 and 19 are provided in the left and right areas, respectively, surrounded by the circular disc receptacle 6 and curved rear side 10.

Figure 4:
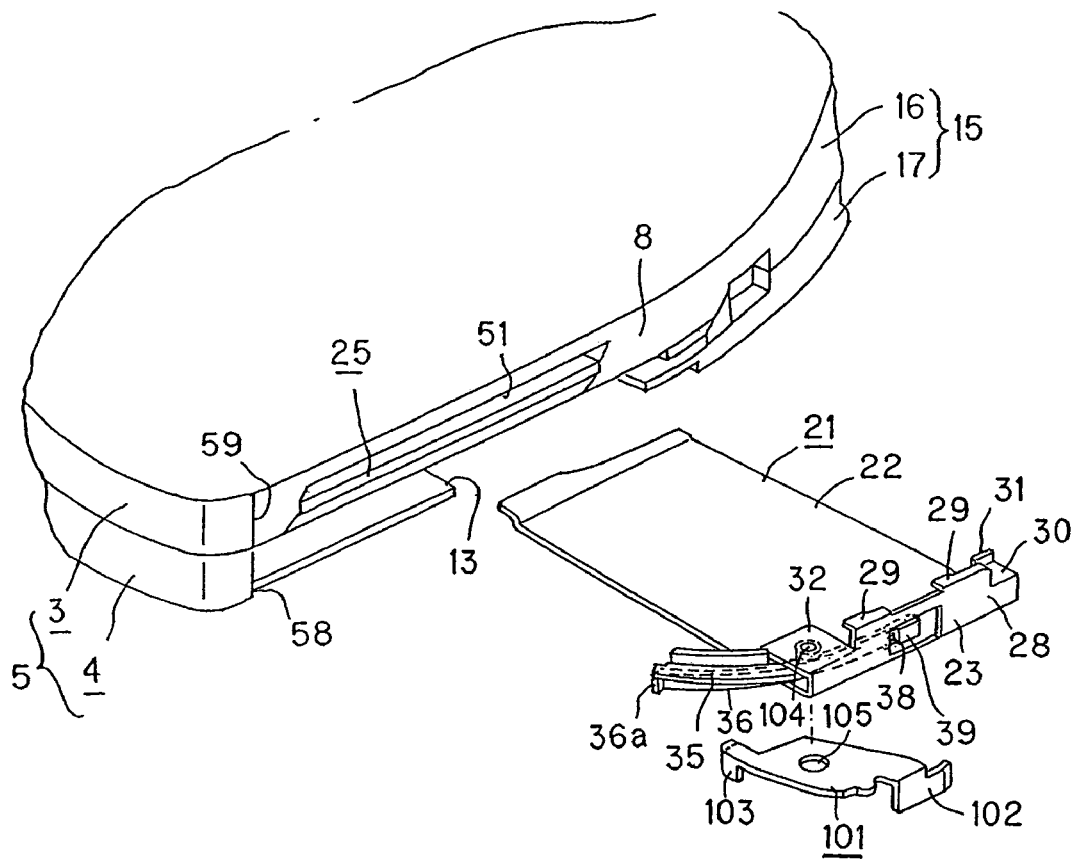
FIG. 4 is a perspective view of the shutter member and cartridge body on which the shutter member is installed.
Figure 5:
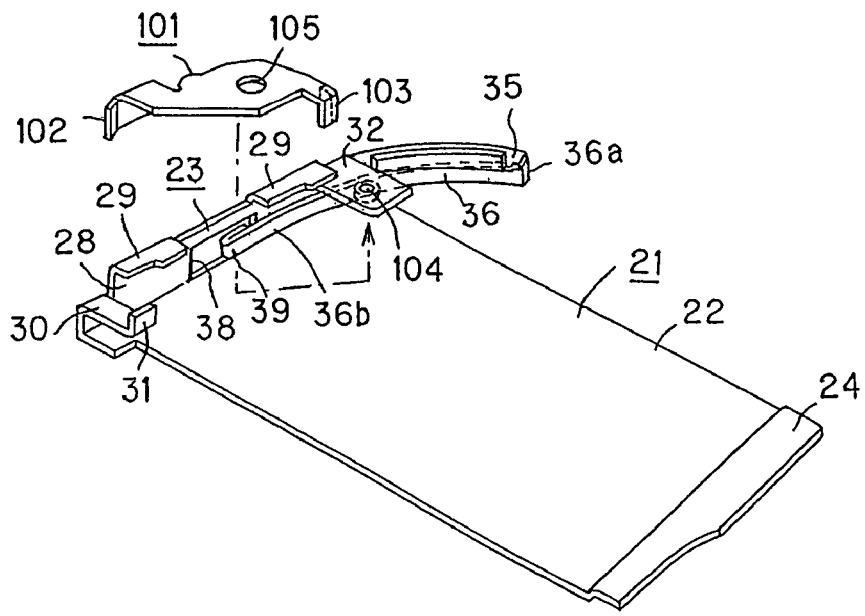
FIG. 5 is a perspective view of the elastic moving piece having the shutter movement limiter provided thereon and shutter member having the elastic moving piece provided thereon.

As shown in FIGS. 1 to 3. the disc cartridge 1 constructed as above has installed on the body 5 thereof a shutter member 21 that opens and closes the disc-access aperture 13. The shutter member 21 is formed by punching and bending a thin sheet metal or by molding a synthetic resin such as polycarbonate. As shown in FIGS. 2 and 3, it includes a flat shutter portion 22 formed rectangular to have a sufficient size to close the disc-access aperture 13 and a cartridge supporting portion 23 formed at the base end of the shutter portion 22 to have a generally C-shaped section. The shutter portion 22 has provided at the free end thereof a guide supporting portion 24 that is supported on a shutter guide member 26 installed on the cartridge body 5. The guide supporting portion 24 is formed by bending the free end of the shutter portion 22 toward the cartridge body 5 as shown in FIGS. 4 and 5. The shutter guide member 26 is also formed by molding a synthetic resin such as polycarbonate. As shown in FIG. 3, the shutter guide member 26 has formed therein a concavity 26b in a position off the driving aperture 12 in the lower half 4 as shown in FIG. 3. The shutter guide member 26 has a welding rib provided on either side 26a of the concavity 26b and at which it is joined to the side of the driving aperture 12 of a shutter sliding concavity 58 in the lower half 4 by thermal or ultrasonic welding.

With a sliding guide 25 formed on the upper half 3 of the cartridge body 5 being supported on the cartridge supporting portion 23, the shutter member 21 is supported movably in the direction of arrow A or B in FIGS. 1 and 2 to open or close the disc-access aperture 13.

The sliding guide 25 supporting the shutter member 21 is formed on the upper half 3 to extend over the moving range of the shutter member 21 that opens and closes the disc-access aperture 13 as shown in FIG. 4. The sliding guide 25 is formed on part of the rising peripheral wall 16 of the upper half 3 to support the shutter member 21 within a range defined by the one lateral side 8 of the cartridge body 5.

As shown in FIGS. 4 and 5, the cartridge supporting portion 23 provided on the shutter member 21 includes a movement guide piece 28 formed to rise vertically from the end base of the shutter portion 22, and a pair of first supporting pieces 29 is formed at the free end of the movement guide piece 28 to bend toward the shutter portion 22. Also, at one side of the movement guide piece 28, a second supporting piece 30 bent in the form of L is provided in a position one step lower than where the first supporting pieces 29 are formed. The second supporting piece 30 cooperates with the first supporting pieces 29 to support the sliding guide 25 between them. At the free end of the second supporting piece 30, there is formed an engagement piece 31 bent to project toward the first supporting pieces 29.

At the other side of the movement guide piece 28, a piece 32 bent to project toward the shutter portion 22 is formed at the same level at the second supporting piece 30. The bent piece 32 functions similarly to the second supporting piece 30 to cooperate with the first supporting pieces 29 to support the sliding guide 25 between them.

Figure 6:
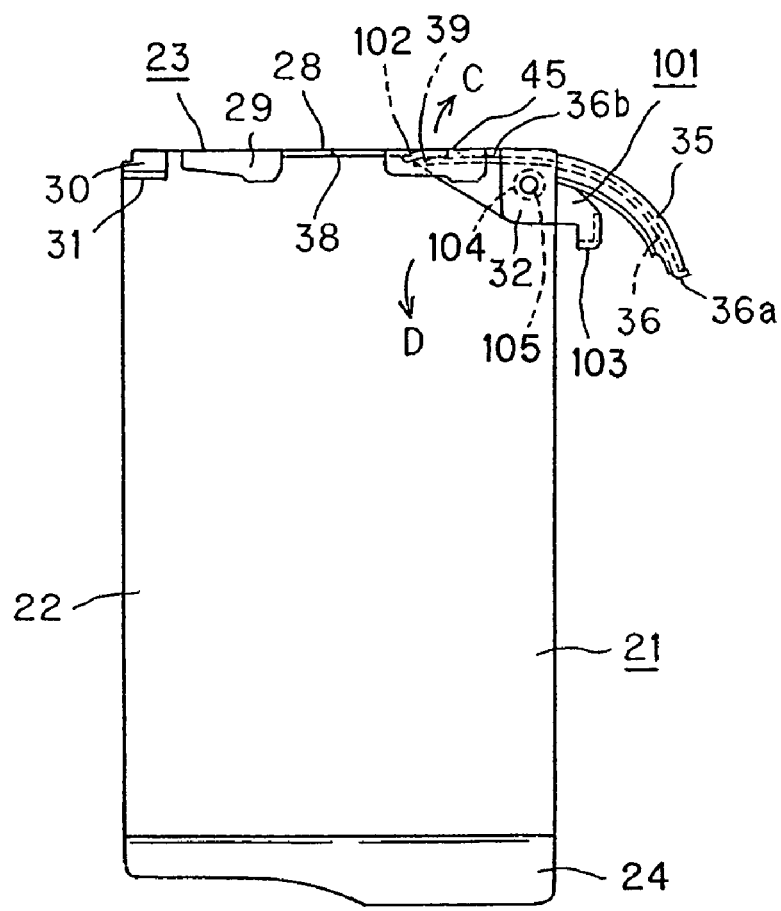
FIG. 6 is a plan view of the shutter member having the elastic moving piece installed thereon.

As shown in FIGS. 4 and 5, a connecting arm 35 is provided extending from one side of the movement guide piece 28 included in the cartridge supporting portion 23 of the shutter member 21. That is, the connecting arm 35 is formed to extend from one side of the movement guide piece 28 positioned for movement in the direction to open the disc-access aperture 13 when the shutter member 21 is installed on the cartridge body 5 as shown in FIG. 6. Also, the connecting arm 35 extends from one side of the movement guide piece 28 while bending to extend along the outer periphery of the circular disc receptacle 6 when the shutter member 21 is installed on the cartridge body 5. That is, the connecting arm 35 extends while bending toward the free end of the shutter portion 22 where the guide supporting portion 24 is provided.

To the free end of the connecting arm 35, there is connected an elastic moving piece 36 fixed at the base end thereof to extend along the connecting arm 35 as shown in FIG. 6. The elastic moving piece 36 is connected at the base end thereof to the free end of the connecting arm 35 by welding or bonding. At this time, the connecting arm 35 is positioned in relation to the connecting arm 35 with a bent portion 36a at the base end thereof being in abutment with the free end of the connecting arm 35.

Figure 7:
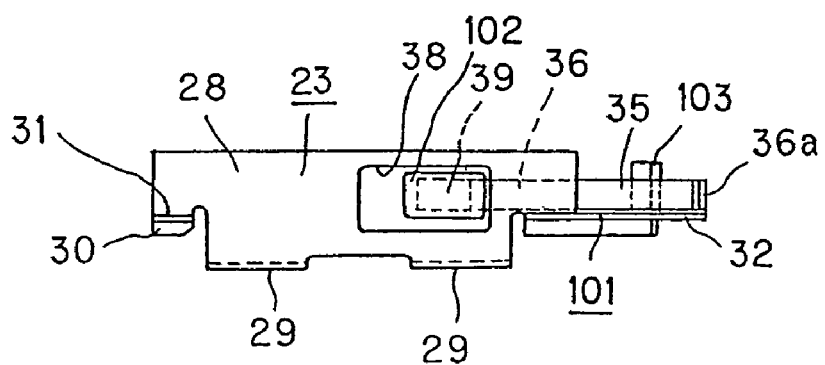
FIG. 7 is a front view, from the movement guide piece, of the shutter member having the elastic moving piece installed thereon.

Also, as shown in FIGS. 6 and 7, the elastic moving piece 36 is provided at the base end of the shutter portion 22 and formed to extend to a window 38 formed in the movement guide piece 28 opposite to the one lateral side of the cartridge body 5, and has a pressing piece 39 provided at the free end thereof which faces the window 38. The pressing piece 39 is to be pressed by a shutter releasing piece as part of a shutter releasing mechanism provided at the disc recorder/player when the disc cartridge 1 is loaded into the disc recorder/player.

Further, the elastic moving piece 36 is connected to the connecting arm 35 so that it is applied with a force to project the pressing piece 39 from the window 38 while its free end is in abutment with the inner surface of the movement guide piece 28. That is, the elastic moving piece 36 is extended toward the movement guide piece 28 while being bent from the base end connected to the connecting arm 35 and has the free end thereof pressed to the movement guide piece 28. Thus, the elastic moving piece 36 is pressed in the direction of arrow C in FIG. 6.

Figure 11:
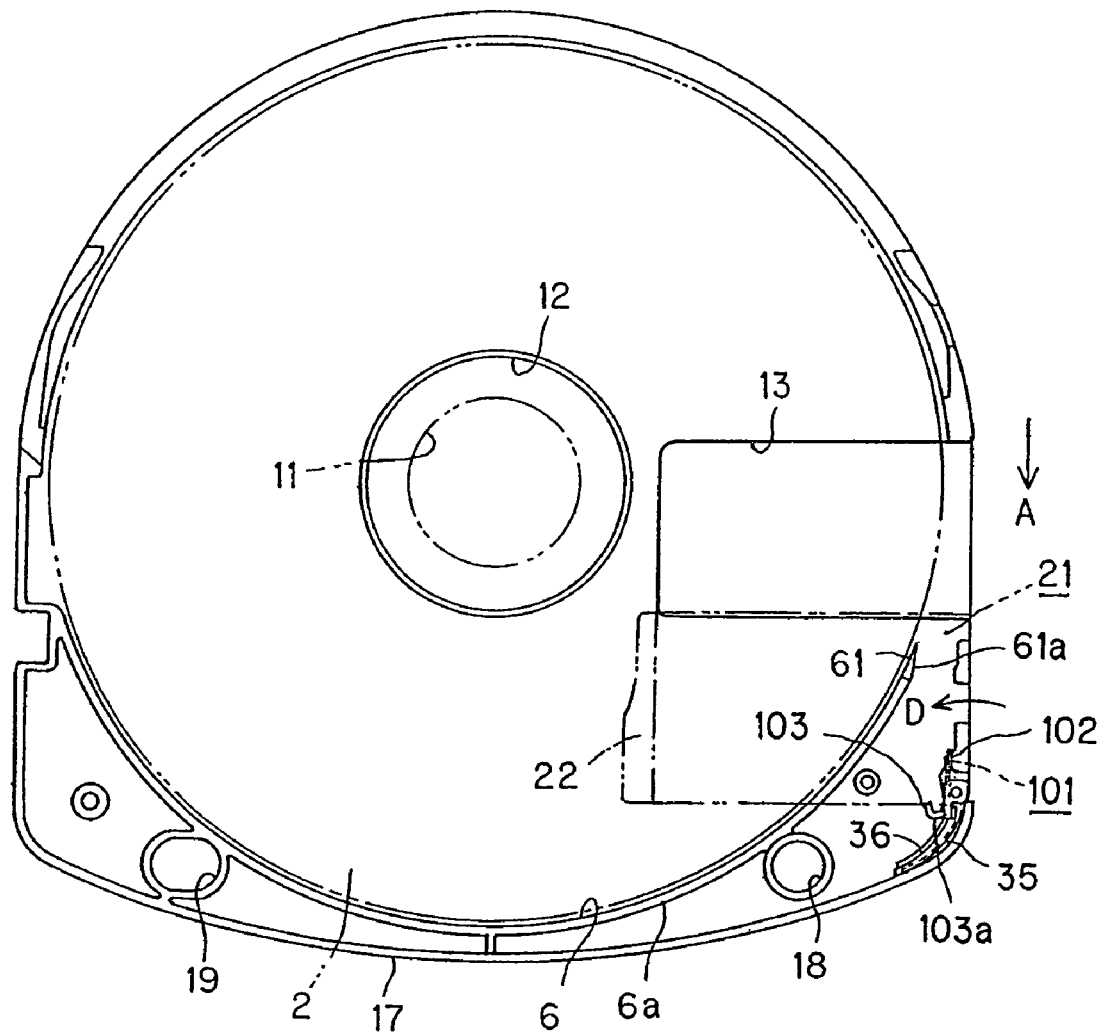
FIG. 11 is a plan view, from inside the lower half of the disc cartridge, of the shutter member having moved to the position to open the disc-access aperture.

The elastic moving piece 36 has a straight portion 36b extending in parallel with the movement guide piece 28. The connecting arm 35 and elastic moving piece 36 are so formed that the bent portion 36a will have a curvature generally identical to the curvature of the inner surface of the rising peripheral walls 16 and 17 of the upper and lower halves 3 and 4, respectively, forming the corner of the bent portion 10 of the cartridge body 5, that is, the curvature of the inner surface of the outer peripheral wall 15 of the cartridge body 5 as shown in FIG. 11 when the shutter member 21 is in the position to open the disc-access aperture 13. Thus, the shutter member 21 can be blocked by the repulsion of the elastic moving piece 36 from moving in the direction to close the disc-access aperture 13 when the shutter member 21 opens the disc-access aperture 13.

Note that the connecting arm 35 and elastic moving piece 36 may be formed from the same material as, or different material from, that of the shutter member 21, for example, metal such as stainless steel, aluminum or the like or a synthetic resin. In case the radius of curvature of the inner surface of the rising peripheral walls 16 and 17 of the upper and lower halves 3 and 4, respectively, of the corner of the bent portion 10 of the cartridge body 5, that is, the inner surface of the outer peripheral wall 15 of the cartridge body 5, is for example 5 mm or so, the elastic moving piece 36 may be formed about 0.14 mm in thickness and about 0.5 to 1 mm in width to have an extremely small repulsion of about 5 to 10 g. Also, the connecting arm 35 and elastic moving piece 36 may be formed integrally with each other by bending a leaf spring-like elongated sheet metal. That is, they may be formed from a single elastic material.

The bent piece 32 formed at the other side of the movement guide piece 28 has a shutter movement limiting member 101 installed thereon. As shown in FIGS. 4 and 5, the shutter movement limiting member 101 is formed by punching or bending a thin sheet metal and includes a pressing portion 102 formed at one end and an engagement portion 103 formed at the other end. The pressing portion 102 is formed by bending the one-end side of the shutter movement limiting member 101 almost vertically. The pressing portion 102 is to be pressed by the shutter releasing portion that is part of the shutter releasing mechanism provided at the disc recorder/player when the disc cartridge 1 is loaded into the disc recorder/player.

Note that the pressing piece 39 provided at the free end of the elastic moving piece 36 is located inside the pressing portion 102 of the shutter movement limiting member 101 and is to press the pressing portion 102 in the direction of arrow C in FIG. 6.

Also, the engagement portion 103 is formed by bending the other-end side of the shutter movement limiting member 101 almost vertically. The engagement portion 103 is engaged on the movement limiter 61 provided at the cartridge body 5 when the shutter member 21 is installed on the cartridge body 5 to limit the shutter member 21 staying in the position to close the disc-access aperture 13 from moving in the direction to open the disc-access aperture 13.

Figure 8:
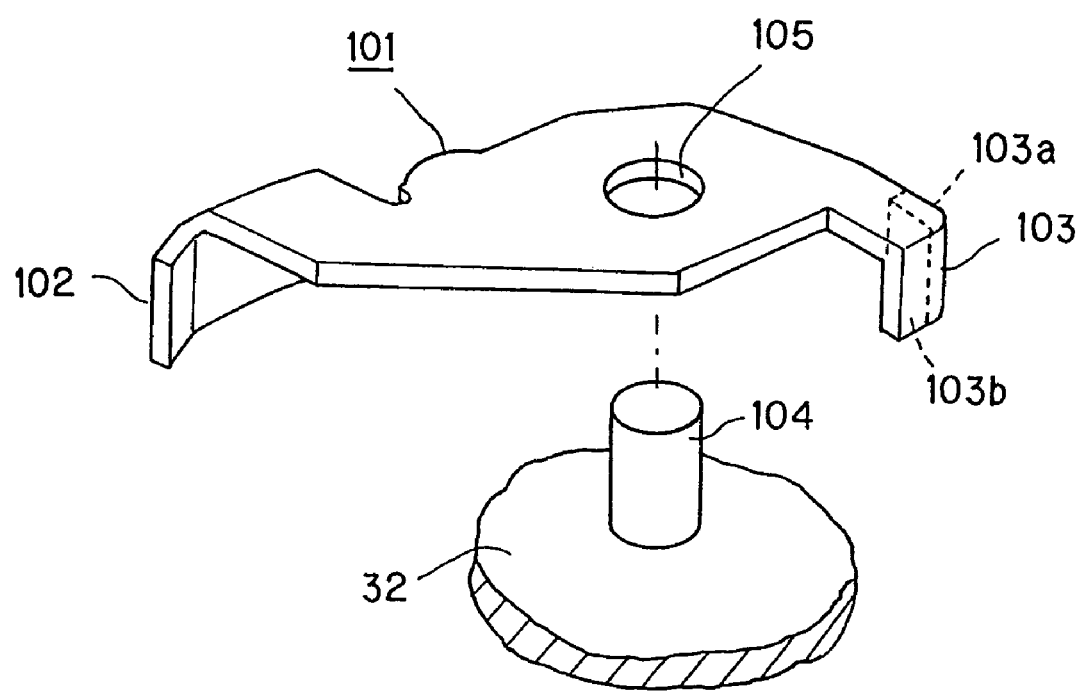
FIG. 8 is a perspective view of the shutter movement limiting member.

More specifically, the side of the engagement portion 103 opposite to the movement limiter 61, that is, the end side in the sliding direction of the shutter member 21 (direction of arrow A in FIG. 1), is formed circular in the C or R plane as shown in FIG. 8 so that the engagement portion 103 can smoothly engage on or disengage from the movement limiter 61 provided at the cartridge body 5. Also, even if the shutter member 21 is forced to slide, the circular form of the engagement portion 103 permits to prevent the movement limiter 61 from being damaged. The engagement portion 103 is formed by bending two adjacent rising pieces 103a and 103b at their corners into a generally circular form.

When the shutter member 21 is installed to the cartridge body 5, the shutter movement limiting member 101 is fixed to the bent piece 32 with the pressing portion 102 being put opposite to the window 38 in the movement guide piece 28 opposite to the one lateral side 8 of the cartridge body 5 as shown in FIGS. 6 and 7. At this time, the engagement portion 103 at the other end will be positioned to project from the other side where the bent piece 32 of the shutter member 21 is provided.

Also, the shutter movement limiting member 101 has a through-hole 105 formed in the center thereof, and the bent piece 32 has a cylindrical projection 104 formed by burring at the center thereof. By caulking the cylindrical projection 104 inserted in the through-hole 105 to crush its free end, the shutter movement limiting member 101 is installed to the bent piece 32 pivotably about the projection 104.

When the shutter movement limiting member 101 is thus installed to the bent piece 32 with the pressing portion 102 positioned between the movement guide piece 28 and elastic moving piece 36, the rear side of the pressing portion 102 will be pressed by the elastic moving piece 36 and pivoted in the direction of arrow C in FIG. 6 in which the pressing portion 102 projects from the window 38, and the engagement portion 103 will positively be engaged on the moving limiter 61 at the cartridge body 5. When the pressing portion 102 is pressed against the force of the elastic moving piece 36, the shutter movement limiting member 101 will be turned about the projection 104 in the direction of arrow D in FIG. 6. Thus, the engagement portion 103 will be disengaged from the movement limit 61.

Note that the pressing portion 102 is pressed as above when the disc cartridge 1 is inserted into a cartridge holder of the disc recorder/player with which the disc cartridge 1 is compatible as a recording medium and thus a shutter releasing piece 93 of a shutter releasing mechanism 91 provided at the cartridge holder enters the window 38.

Figure 9:
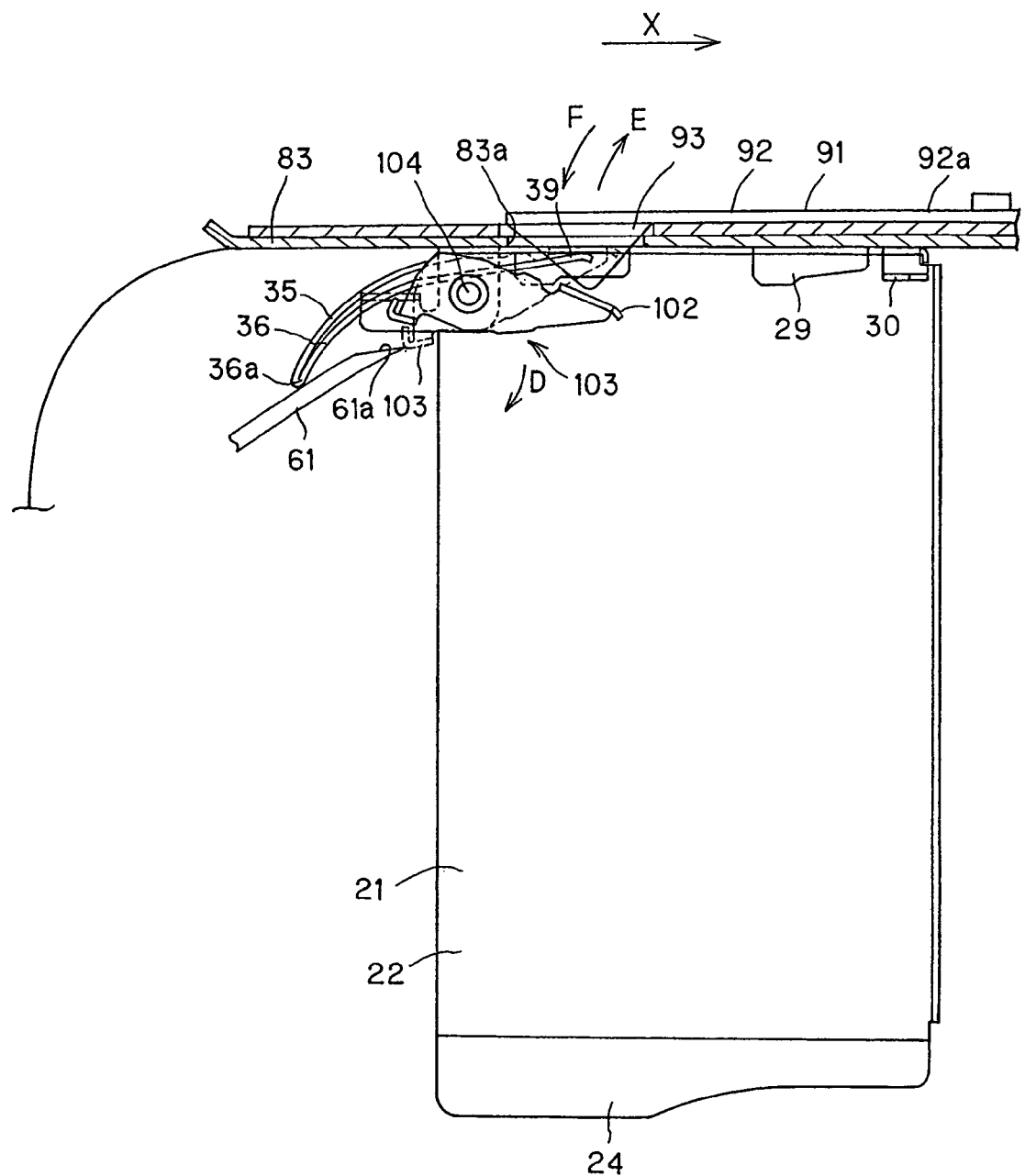
FIG. 9 is a plan view of the cartridge holder having the disc cartridge inserted therein.
Figure 10:
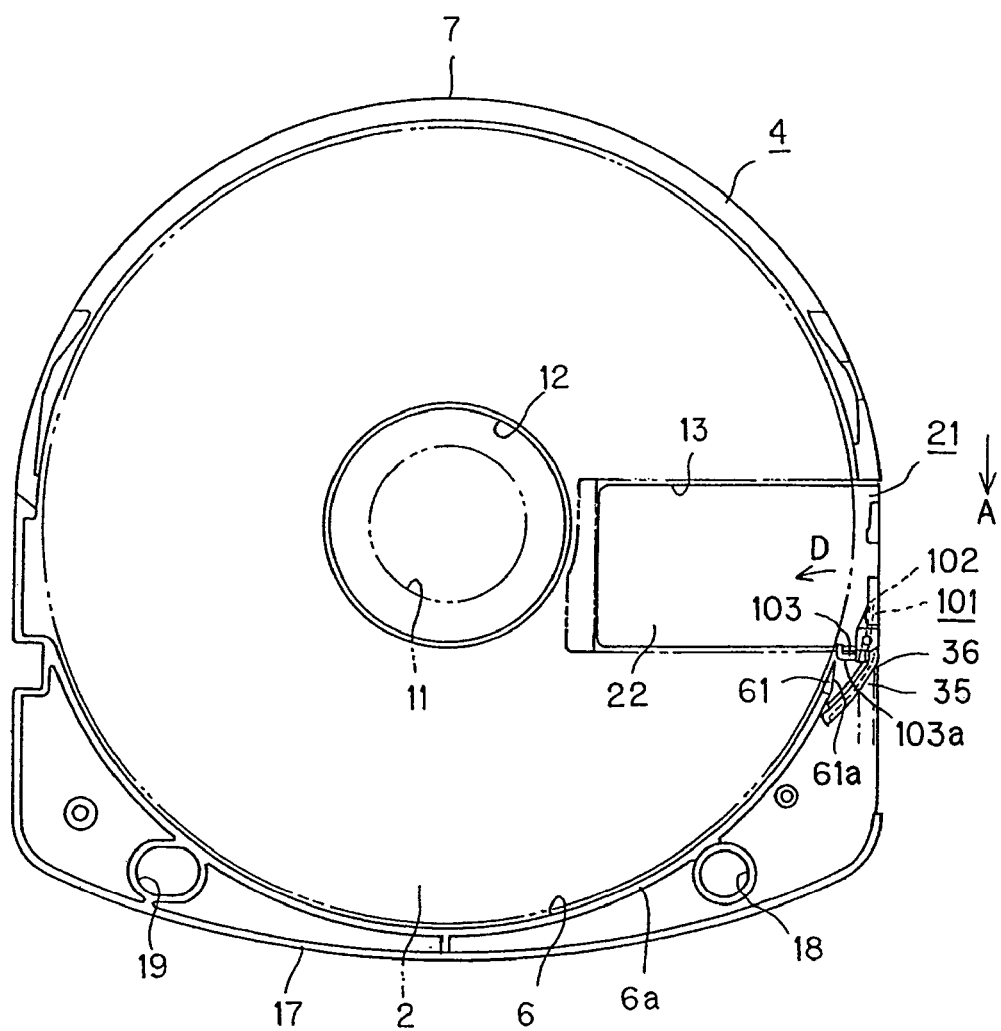
FIG. 10 is a plan view, from inside the lower half of the disc cartridge, of the shutter member having closed the disc-access aperture.

As above, when the shutter member 21 is moved to the position to close the disc-access aperture 13, the engagement portion 103 of the shutter movement limiting member 101 installed pivotably on the shutter member 21 is placed opposite to the movement limiter 61 at the cartridge body 5 as shown in FIGS. 9 and 10. Then, when the shutter member 21 is going to move in the direction of arrow A in FIG. 10 to open the disc-access aperture 13, the engagement portion 103 abuts the movement limiter 61 at the cartridge body 5 to limit the shutter member 21 from moving, and thus the shutter portion 22 will keep the disc-access aperture 13 closed.

Note that as shown in FIG. 10, the movement limit 61 at the cartridge body 5 is formed contiguously to one end, facing the disc-access aperture 13, of the circular disc receptacle wall 6a of the disc receptacle 6. The circular disc receptacle wall 6a rises vertically from the inner surface of the lower half 4. The movement limit 61 has an inclined surface 61a at the free end thereof for smooth engagement on, and disengagement from, the engagement portion 103. The inclined surface 61a is formed to be thinner toward its free end in the direction of the thickness of the circular disc receptacle wall 6a.

Also, the circular disc receptacle wall 6a of the disc receptacle 6 is not formed at the circular front side 7 of the cartridge body 5 at which the disc is to first be inserted into the disc recorder/player and where the rising peripheral walls 16 and 17 of the outer peripheral wall form together part of the disc receptacle 6.

To move the shutter member 21 staying in the position to close the disc-access aperture 13 and limited from moving in order to open the disc-access aperture 13, for example, the shutter releasing piece 93 of the shutter releasing mechanism 91 provided at the cartridge holder in the disc recorder/player is entered into the window 38 to press the pressing piece 39 and pressing portion 102 in order to pivot the shutter movement limiting member 101 in the direction of arrow D in FIG. 10. When the shutter movement limiting member 101 is pivoted in the direction of arrow D in FIG. 10, the engagement portion 103 moves toward the one lateral side 8 of the cartridge body 5 and thus it will not be opposite to the movement limiter 61 as shown in FIG. 9. Thus, the shutter member 21 is released by the movement limiter 61 from the movement-limited state to be movable in the direction of arrow A in FIG. 10 to open the disc-access aperture 13.

As above, since the shutter member 21 staying in the position to close the disc-access aperture 13 is limited from moving in the direction to open the disc-access aperture 13, the disc cartridge 1 can positively protect the optical disc housed in the cartridge body 5.

Figure 12:
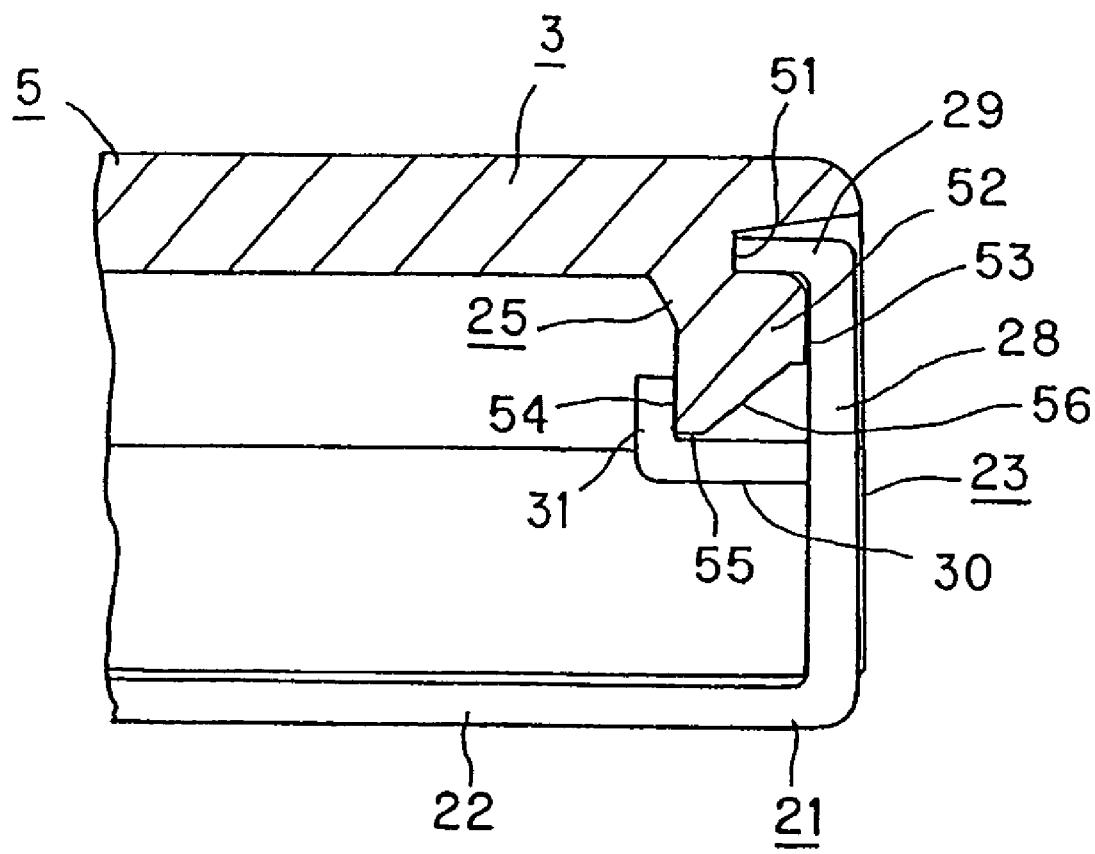
FIG. 12 is a sectional view of the shutter member installed to the guide rail provided on the upper half of the disc cartridge.

Note here that the shutter member 21 constructed as above is installed movably on the cartridge body 5 with the sliding guide 25 being supported by the cartridge supporting portion 23. The sliding guide 25 to support the shutter member 21 movably is formed at part of the rising peripheral wall 16 of the upper half 3 as shown in FIGS. 4 and 12. The sliding guide 25 includes a guide recess 51 formed on the outer lateral side of the rising peripheral wall 16 in parallel to the moving direction of the shutter member 21, and a guide rail 52 held tight between the first and second supporting pieces 29 and 30 as shown in FIG. 12.

The outer surface of the guide rail 52 is perpendicular to the plane of the upper half 3. The outer surface of the guide rail 52 is opposite to the inner surface of the movement guide piece 28 of the sliding guide 25 and forms a first guide wall 53 to guide the moving direction of the shutter member 21. Also, the inner surface of the guide rail 52 is parallel to the first guide wall 53. The inner surface of the guide rail 52 is opposite to the second supporting piece 30 and bent piece 32 and forms a second guide wall 54 to guide the moving direction of the shutter member 21. Further, the free end face of the guide rail 52 is perpendicular to the first and second guide walls 53 and 54. The free end face is opposite to the second supporting piece 30 and bent piece 32 and forms a third guide wall 55 to guide the moving direction of the shutter member 21. In addition, the end corner from the first guide wall 53 to third guide wall 55 of the guide rail 52 is formed as an inclined surface 56. The inclined surface 56 functions as a relief surface when the engagement pieces 31 and 33 on the shutter member 21 are engaged on the second guide wall 54 of the guide rail 52.

To support he shutter member 21 on the sliding guide 25 constructed as above, the shutter portion 22 is disposed to extend over the disc-access aperture 13 in the lower half 4 and then the cartridge supporting portion 23 is engaged on the sliding guide 25. To support the cartridge supporting portion 23 on the sliding guide 25, first the first supporting piece 29 is engaged in the guide recess 51 and then the engagement pieces 31 and 33 are placed to face the second guide wall 54 of the guide rail 52 while being held along the inclined surface 56. Once the first supporting piece 29 is engaged in the guide recess 51 and engagement pieces 31 and 33 are placed to face the second guide wall 54, the shutter member 21 is supported movably on the upper half 3 with the guide rail 52 being held tight among the first and second supporting pieces 29 and 30 and bent piece 32 as shown in FIG. 12.

At this time, the movement guide piece 28 becomes opposite to the first guide wall 53, engagement pieces 31 and 33 become opposite to the second guide wall 54 and the second supporting piece 30 and bent piece 32 become opposite to the third guide wall 55, the sliding guide 25 limits the movement in the moving direction of the shutter member 21 and in the direction of thickness of the cartridge body 5 perpendicular to the moving direction of the shutter member 21. Thus, the shutter member 21 can be moved being stably guided by the sliding guide 25 without any large play.

Also, since the guide supporting portion 24 at the free end of the shutter portion 22 is supported on the shutter guide member 26 as shown in FIG. 2 when the shutter member 21 is installed on the cartridge body 5, the shutter portion 22 can be prevented from being lifted from the cartridge body 5, which assures a stable movement of the shutter member 21.

As above, the shutter member 21 installed on the cartridge body 5 is guided by the guide rail 52 to move between the position to close the disc-access aperture 13 as shown in FIG. 3 and position to open the disc-access aperture 13 as shown in FIG. 2.

Note that in the disc cartridge 1 according to the present invention, the shutter member 21 is installed on the cartridge body 5 not to project from at least the periphery of the cartridge body 5. More specifically, the shutter member 21 is installed to be flush with the periphery of the cartridge body 5. That is, in the zone where the shutter portion 22 at the lower half 4 moves, there is formed the shutter sliding concavity 58 as shown in FIGS. 2 and 3. The shutter sliding concavity 58 is formed to such a sufficient depth that the shutter portion 22 will not project from the surface of the cartridge body 5. Also, a guide piece sliding concavity 59 is formed at the one lateral side 8 of the cartridge body 5. The movement guide piece 28 of the cartridge supporting portion 23 is to slide in the guide piece sliding concavity 59. It is formed contiguous to the shutter sliding concavity 58. The guide piece sliding concavity 59 is also formed to such a depth that the movement guide piece 28 will not project from the surface of the cartridge body 5.

Also, when the shutter member 21 has been moved to the position to close the disc-access aperture 13 as shown in FIG. 3, part of the shutter portion 22 will abut the rising surface of the shutter sliding concavity 58 and thus be limited from further moving in the direction to close the disc-access aperture 13.

Since the shutter member 21 has installed thereon the elastic moving piece 36 having the shutter movement limiting member 101 to limit the shutter member 21 from moving in the direction to close the disc-access aperture 13, the number of parts of the disc cartridge 1 can be reduced. Further, since the shutter movement limiting member 101 is provided integrally with the bent piece 32 of the shutter member 21, the cartridge body 5 may not have any inner space for installation of the shutter movement limiting member 101, which will permit to design the disc cartridge 1 itself smaller.

Next, there will be explained opening or closing the disc-access aperture 13 by the shutter member 21 when the aforementioned disc cartridge 1 as a recording medium is loaded into, or ejected from, the disc recorder/player.

Figure 13:
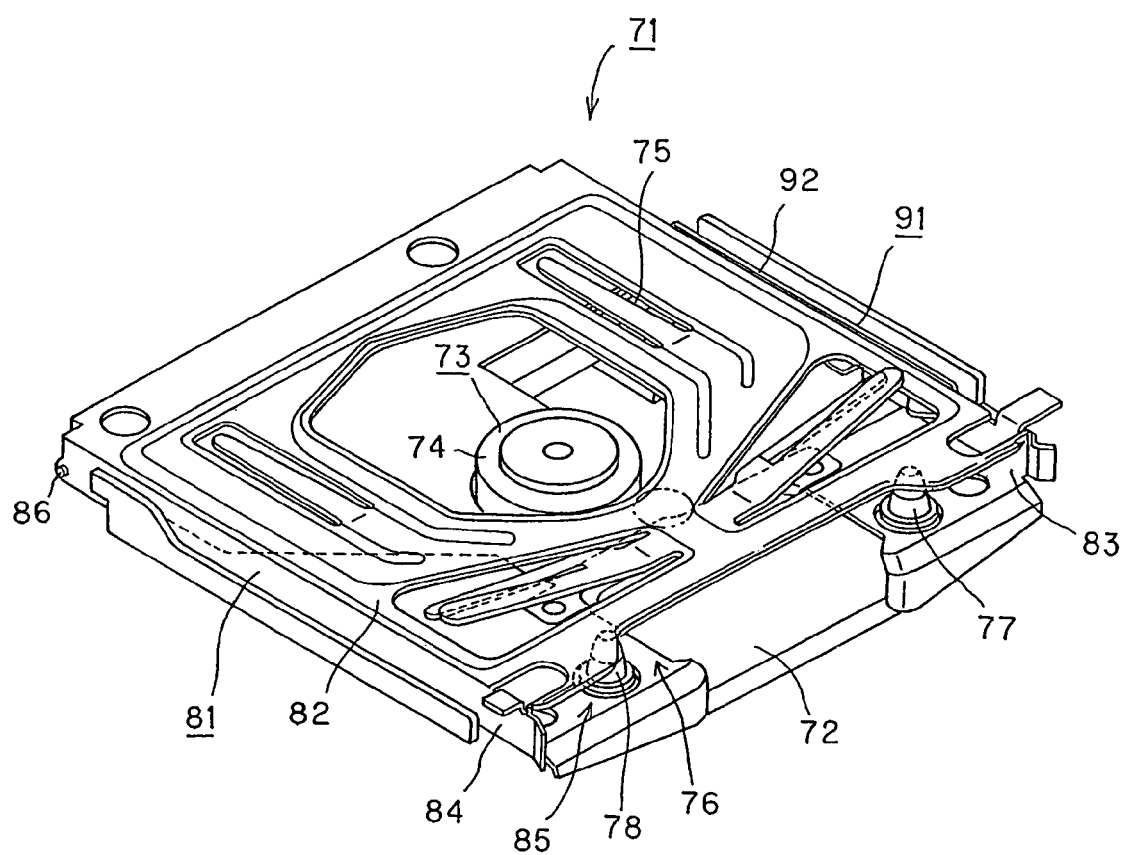
FIG. 13 is a perspective view of the disc drive of a disc recorder and/or playback apparatus with which the disc cartridge according to the present invention is compatible.

An example of the disc recorder/player compatible with the disc cartridge 1 as a recording medium is explained herebelow with reference to FIG. 13. The disc recorder/player includes a disc drive, generally indicated with a reference numeral 71, as shown in FIG. 13. The disc drive 71 is to be disposed within a housing of the disc recorder/player, and it includes a rectangular base 72. The base 72 has installed thereon a disc rotation driving mechanism 73 to rotate the optical disc 2 housed in the disc cartridge 1 to be loaded into the disc recorder/player. The disc rotation driving mechanism 73 is installed on the base 72 so that a turn-table 74 on which the optical disc 2 is mounted will project from the upper surface of the base 72.

Also, the base 72 has installed thereon an optical head 75 that scans the signal recording area of the optical disc 2 being rotated by the disc rotation driving mechanism 73 to read information signals recorded in the optical disc 2.

Note that in case the disc drive 71 is designed to write and read information signals, it uses an optical head 75 of a write/read type. The optical head 75 is supported by a supporting mechanism (not shown) to be movable between inner and outer radii of the optical disc 2 loaded in the disc rotation driving mechanism 73, and it is moved by a head moving mechanism including a drive motor in a range between the inner and outer radii of the optical disc 2.

On the top of the base 72, there is formed a cartridge receptacle 76 having provided thereon a pair of positioning pins 77 and 78 and a pair of supporting pins (not shown). The disc cartridge 1 to be put into the cartridge receptacle 76 has the pair of positioning pins 77 and 78 engaged into the first and second positioning holes 18 and 19, respectively, formed therein and it is supported on the supporting pins. Thus, it is positioned horizontally and in the direction of height.

Also, on the top of the cartridge receptacle 76 on the base 72, there is provided a cartridge holder 81 to hold the disc cartridge 1 and put or remove the disc cartridge 1 into or from in the cartridge receptacle 76. The cartridge holder 81 is formed rectangular to have such a sufficient size to hold the disc cartridge 1, and has provided at the opposite sides of a top plate 82 cartridge supports 83 and 84 each formed to have an L-shaped section. The cartridge holder 81 has an open front side used as a cartridge slot 85. The disc cartridge 1 is passed through the cartridge slot 85 for insertion into or ejection from inside the cartridge holder 81. The disc cartridge 1 is inserted first at the circular front side 7 thereof into the cartridge holder 81.

The cartridge holder 81 is pivotably supported on the base 72 by a spindle 86 provided at either rear end thereof opposite to the front side where the cartridge slot 85 is formed. For insertion or ejection of the disc cartridge 1 into or from the cartridge holder 81, the latter is to be turned upwardly of the base 72. With the cartridge holder 81 having the disc cartridge 1 inserted therein being turned toward the base 72, the disc cartridge 1 is set in place in the cartridge receptacle 76.

Note that the cartridge holder 81 includes the shutter releasing mechanism 91 to move the shutter member 21 to the position to open the disc-access aperture 13 when the disc cartridge 1 is inserted into the cartridge holder 81. As shown in FIG. 9, the shutter releasing mechanism 91 includes the elongated leaf spring 92 fixed at the base end 92a thereof to the outer side of one (83) of the cartridge supports 83 and 84 and shutter releasing piece 93 provided at the free end of the leaf spring 92 and projecting into the cartridge holder 81. The shutter releasing piece 93 is formed by folding back part of the free end of the leaf spring 92. Also, the shutter releasing piece 93 is projected into the cartridge holder 81 through a cut 83a formed in the lateral side of one (83) of the cartridge supports 83 and 84.

When the disc cartridge 1 is inserted into the cartridge holder 81, the shutter releasing mechanism 91 enters the window 38 formed in the shutter member 21 to press the pressing piece 39 and pressing portion 102 and thus pivot the elastic moving piece 36 in the direction of arrow D in FIG. 9 so that the engagement portion 103 of the shutter movement limiting member 101 will not abut the movement limiter 61, thereby moving the shutter member 21 in the direction to open the disc-access aperture 13.

When the disc cartridge 1 is inserted into the cartridge holder 81 with the aforementioned shutter releasing mechanism 91, the shutter member 21 is moved to open the disc-access aperture 13 as will be described in detail below:

As the disc cartridge 1 is inserted first at the circular front side 7 thereof into the cartridge holder 81 in the direction of arrow X in FIG. 9, the shutter releasing piece 93 will ride on the movement guide piece 28 of the shutter member 21. At this time, as the shutter releasing piece 93 is pressed by the movement guide piece 28, the leaf spring 92 will resiliently be displaced in the direction of arrow E in FIG. 9 to move the shutter releasing piece 93 to outside the cartridge holder 81.

Further, when the shutter releasing piece 93 arrives at a position opposite to the window 38 formed in the movement guide piece 28 with the disc cartridge 1 having been inserted into the cartridge holder 81 in the direction of arrow X in FIG. 9, the leaf spring 92 once resiliently displaced will resiliently be returned in the direction of arrow F in FIG. 9 and the shutter releasing piece 93 at the free end of the leaf spring 92 will enter the window 38. The shutter releasing piece 93 having entered the window 38 will press the pressing piece 39 to resiliently displace the elastic moving piece 36 in the direction of arrow D in FIG. 9. Then, the shutter movement limiting member 101 turns in the same direction, so that the engagement portion 103 will not be opposite to the movement limiter 61. Thus, the shutter member 21 will be released by the movement limiter 61 at the cartridge body 5 from the movement-limited state. At this time, the shutter member 21 will have the shutter releasing piece 93 engaged in the window 38. When the disc cartridge 1 is further inserted from this state into the cartridge holder 81, the cartridge body 5 will move in relation to the shutter member 21 to open the disc-access aperture 13 as shown in FIG. 11. When the disc cartridge 1 arrives at a predetermined position of insertion in the cartridge holder 81, the disc-access aperture 13 will be opened to the full extent.

Note that while the disc cartridge 1 is inserted in the cartridge holder 81, the shutter releasing piece 93 is kept engaged in the window 38 and thus the shutter member 21 is held in the position to open the disc-access aperture 13.

When the cartridge holder 81 is turned toward the cartridge receptacle 76, the disc cartridge 1 having the disc-access aperture 13 opened and inserted in the cartridge holder 81 is set in place in the cartridge receptacle 76 as above.

When the disc cartridge 1 is placed in the cartridge receptacle 76, the optical disc 2 housed in the disc cartridge 1 is set on the turn-table 74 and ready for rotation by the disc rotation driving mechanism 73. At this time, the optical head 75 will be opposite to the optical disc 2 through the opened disc-access aperture 13. In this state, information signals can be read from the optical disc 2 by driving the disc rotation driving mechanism 73 to put the optical head 75 into operation.

To eject the disc cartridge 1 from in the cartridge receptacle 76, the ejecting mechanism provided at the disc recorder/player is operated to stop reading from the optical disc 2. When the cartridge holder 81 is turned to a position above the base 72 and off the cartridge receptacle 76, the rear side of the disc cartridge 1 will project from the cartridge slot 85. When the disc cartridge 1 is drawn out of the cartridge holder 81 by holding a portion of the disc cartridge 1 projected from the cartridge slot 85, the cartridge body 5 is moved in relation to the shutter member 21 held by the shutter releasing mechanism 91 and the shutter member 21 moves to the position to close the disc-access aperture 13. When the disc cartridge 1 is further drawn out from the cartridge holder 81, the shutter releasing piece 93 will be disengaged from the window 38 and released from the pressing by the pressing piece 39. The elastic moving piece 36 released from the pressing by the pressing piece 39 will resiliently be returned under its own elasticity. The shutter movement limiting member 101 is turned along with the elastic moving piece 36 to put the engagement portion 103 into abutment with the movement limiter 61 at the cartridge body 5 and thus limit the shutter member 21 from moving. Thus, the shutter portion 22 keeps the disc-access aperture 13 closed.

As above, the disc recorder/player compatible with the disc cartridge 1 may be a simple one having the shutter releasing mechanism including the shutter releasing piece 93 provided at one end of the leaf spring 92. So, the disc recorder/player itself can easily be designed simpler and smaller.

In the foregoing, the present invention has been described concerning the disc cartridge housing the read-only optical disc as an example. However, the present invention is applicable to any other types of disc cartridge housing a rewritable optical disc or other disc-shaped recording medium and also to a disc cartridge housing a cleaning disc with the same advantages as that in application to the aforementioned disc cartridge.

Also, in the foregoing, there has been described the disc cartridge including the cartridge body whose front side is formed circular for a smaller design of the disc cartridge itself. However, the present invention is not limited to this type of cartridge body but is applicable to a disc cartridge including a rectangular cartridge body having widely been used.

It should be understood by those skilled in the art that various modifications, combinations, sub-combinations and alterations may occur depending upon design requirements and other factors insofar as they are within the scope the appended claims or the equivalents thereof.

What is claimed is:

1. A disc cartridge comprising:
    a disc;
    a cartridge body having the disc rotatably housed therein and having formed therein a write and/or read aperture through which part of the disc is exposed to outside in a range between inner and outer radii thereof;
    a shutter member including a shutter portion to open and close the write and/or read aperture and installed to the cartridge body to be movable between a position to close the write and/or read aperture and a position to open the write and/or read aperture;
    a connecting arm extending from one lateral side of the shutter member;
    an elastic moving piece installed to extend along the connecting arm with a base end thereof being fixed to a free end of the connecting arm, having a pressing piece provided at a base end of the shutter member to face a window formed in a movement guide piece opposite to a one lateral side of the cartridge body and forced for the pressing piece to project to outside the cartridge body through the window; and
    a shutter movement limiting member provided pivotably on the shutter member to limit, when the shutter member is in the position to close the write and/or read aperture, the shutter member from moving in a direction to open the write and/or read aperture by engaging an engagement portion on a movement limiter provided on the cartridge body, and to pivot along with the elastic moving piece in a direction disengaging the engagement portion from the movement limiter when the elastic moving piece is pressed by means of the pressing piece against a force applied to the latter,
    the engagement portion being formed circular at a side of the movement limiter.

2. The disc cartridge according to claim 1, wherein the elastic moving piece is formed to extend along an inner surface of an outer peripheral wall of the cartridge body.

3. The disc cartridge according to claim 1, wherein the elastic moving piece is formed integrally with the shutter member.

4. The disc cartridge according to claim 1, wherein:
    the cartridge body is formed by butt-joining of a pair of upper and lower halves to each other; and
    the pair of halves is joined to each other by welding end faces of rising walls of the halves, respectively, to each other.

5. The disc cartridge according to claim 1, wherein:
    the cartridge body has positioning holes formed therein at a side thereof opposite to a front side at which it is to first be inserted into a disc recording and/or playback apparatus; and
    the front side of the cartridge body at which the latter is to first be inserted into the disc recording and/or playback apparatus is formed generally as a semicircle of which a center is nearly at that of the disc housed in the disc cartridge.

6. The disc cartridge according to claim 5, wherein the outer peripheral wall of the front side of the cartridge body at which the latter is to first be inserted into the disc recording and/or playback apparatus forms part of a disc receptacle in the cartridge body in which the disc is received.

* * * * *